(12) United States Patent
Kreysing (10) Patent No.: US 12,136,367 B2
(45) Date of Patent: Nov. 5, 2024

(54) SYSTEM FOR DISPLAYING INFORMATION TO A USER

(71) Applicant: MAX-PLANCK-GESELLSCHAFT ZUR FÖRDERUNG DER WISSENSCHAFTEN E.V., Munich (DE)

(72) Inventor: Moritz Kreysing, Dresden (DE)

(73) Assignee: MAX-PLANCK-GESELLSCHAFT ZUR FÖRDERUNG DER WISSENSCHAFTEN E.V., Munich (DE)

(*) Notice: Subject to any disclaimer, the term of this patent is extended or adjusted under 35 U.S.C. 154(b) by 0 days.

(21) Appl. No.: 17/640,708

(22) PCT Filed: Sep. 6, 2019

(86) PCT No.: PCT/EP2019/073899
§ 371 (c)(1),
(2) Date: Mar. 4, 2022

(87) PCT Pub. No.: WO2021/043430
PCT Pub. Date: Mar. 11, 2021

(65) Prior Publication Data
US 2022/0366821 A1 Nov. 17, 2022

(51) Int. Cl.
*G09G 3/00* (2006.01)
*G02B 30/24* (2020.01)
(Continued)

(52) U.S. Cl.
CPC ............ *G09G 3/002* (2013.01); *G02B 30/24* (2020.01); *H02S 10/20* (2014.12); *H02S 10/40* (2014.12);
(Continued)

(58) Field of Classification Search
CPC ............ G09G 3/34; G09G 3/00; G09G 3/002; G09G 2310/08; G09G 2320/0233;
(Continued)

(56) References Cited

U.S. PATENT DOCUMENTS 5,260,885 A   11/1993  Ma
6,875,750 B1   4/2005  Pignot et al.
(Continued)

FOREIGN PATENT DOCUMENTS

CN    201085205 Y    7/2008
CN    101324801 A   12/2008
(Continued)

OTHER PUBLICATIONS

Chen et al., "Liquid crystal display and organic light-emitting diode display: present status and future perspectives," *Light: Science & Applications* 7:17168, 2018. (13 pages).

*Primary Examiner* — Michael A Faragalla
(74) *Attorney, Agent, or Firm* — Seed IP Law Group LLP (57) ABSTRACT

The invention relates to a system for displaying information, comprising: an emission device arranged to emit light so as to display information to a user, the emission device being adapted to emit the light in a pulsed manner so that the intensity of the light varies between a high value and a low value, a selective viewing device comprising a panel, the panel being adapted so that the user can view the light which is emitted by the emission device through that panel so as to visually perceive the information being displayed, the panel having a variable transparency which can be varied between a state of high transparency and a state of low transparency, the system being adapted to synchronize the emission device and the selective viewing device so that the states of the emission device emitting light at a high-intensity value and the states of the panel of the selective viewing device of high transparency overlap in time, the system further comprising (Continued)

a photoelectric conversion means arranged to convert ambient light into electric energy so as to feed the electric energy into the system.

19 Claims, 5 Drawing Sheets

(51) Int. Cl.
    *H02S 10/20*     (2014.01)
    *H02S 10/40*     (2014.01)
    *H02S 30/20*     (2014.01)

(52) U.S. Cl.
    CPC .......... *H02S 30/20* (2014.12); *G09G 2310/08* (2013.01); *G09G 2320/0233* (2013.01); *G09G 2320/0247* (2013.01); *G09G 2330/023* (2013.01)

(58) Field of Classification Search
    CPC ...... G09G 2320/0247; G09G 2330/023; H02S 10/20; H02S 10/40; H02S 30/20; G02B 30/24
    See application file for complete search history.

(56) References Cited

U.S. PATENT DOCUMENTS

| | | | |
|---|---|---|---|
| 2011/0128264 A1* | 6/2011 | Lee | G02F 1/1334 349/86 |
| 2011/0187753 A1* | 8/2011 | Watanabe | H02J 7/00 315/307 |
| 2012/0120047 A1 | 5/2012 | Choi et al. | |
| 2012/0194657 A1 | 8/2012 | Ko | |
| 2013/0229329 A1* | 9/2013 | Liu | G06F 1/1601 345/107 |
| 2013/0290743 A1 | 10/2013 | Lee et al. | |
| 2013/0303087 A1* | 11/2013 | Hauser | H04W 4/80 455/41.2 |
| 2014/0022637 A1 | 1/2014 | Richards et al. | |
| 2015/0070742 A1 | 3/2015 | Sorek et al. | |
| 2017/0199396 A1* | 7/2017 | Knoll | A63B 33/002 |
| 2018/0000363 A1* | 1/2018 | Pekonen | A61B 5/7475 |
| 2019/0250681 A1* | 8/2019 | Kirch | H05K 7/20172 |
| 2022/0093997 A1 | 3/2022 | Valeska Lotsch et al. | |

FOREIGN PATENT DOCUMENTS

| | | | |
|---|---|---|---|
| CN | 201892891 U | 7/2011 | |
| CN | 204028756 U | 12/2014 | |
| CN | 109245266 A | 1/2019 | |
| JP | 2011097170 A | 5/2011 | |
| JP | 2011160543 A | 8/2011 | |
| JP | 2012109530 A | 6/2012 | |
| JP | 2014011811 A | 1/2014 | |
| JP | 2017523481 A | 8/2017 | |
| WO | WO 2006/051306 | * 5/2006 | ......... G02F 1/13357 |
| WO | WO 2006051306 A1 | 5/2006 | |

* cited by examiner

SYSTEM FOR DISPLAYING INFORMATION TO A USER

TECHNICAL FIELD

The present invention relates to a system for the selective viewing and display of images.

TECHNICAL BACKGROUND

It is a common occurrence when using, for example, laptop screens or modern smartphones in brightly lit environments such as, for example, outdoors during the day that often, the brightness of the device is not amenable to reading the content which is displayed. Put simply, ambient light is too bright, compared with the brightness of the screen, to allow for a good contrast. Of course, this could be remedied by moving to an indoor environment or generally a less well-lit environment. However, doing so may not be practical. Further, having to do this reduces the ease of use of the device.

Even indoors, contrast may be reduced for a screen that stands in front of an intensely lit scene, for example, when placed in front of a window, that looks out on a bright summer day. In this case, the viewer may perceive poor contrast when looking at the screen, since the ambient light intensity is too high to comfortably see the content displayed by the screen.

Similarly, reduced contrast may also be experienced due to reflections on the screen itself, if for example bright light from the surrounding is reflected from the screen and masks the displayed information.

One document which (incidentally) relates to this issue is US 2012/0194657 A1, wherein a phenomenon that impacts contrast is explained as described in the following paragraphs:
a common purpose of shutter glasses is to enable 3d vision from 2d displays. For this purpose, a pair of shutter glasses, comprising two anti-synchronized individual shutter glass elements, are configured to transmit light to the left and right eye in an alternating fashion, such that two interlaced video signals, one for the left and one for the right eye, are de-interlaced, meaning correctly gated to left and right eye. In simple terms, each shutter glass opens such that the eye behind it (left or right) is exposed to the correct images, while being closed when the incorrect image is shown.

Often, a robust synchronization between the emitting screen and such shutter glasses is facilitated by exploiting short gaps of darkness when switching between left and right images.

These light emission gaps have multiple purposes, including the suppression of artifacts that could be introduced when LCD crystals, that are part of a video screen, reorient between two successive images. For the synchronization of shutter glasses with a video screen, these dark gaps can be beneficial because they can be used to ensure that shutter opening times are long enough to transmit most light per intended image frame whilst not bearing the risk of transmitting light belonging to the prior or subsequent image. Switching shutter glasses in periods of screen darkness can especially be beneficial in cases in which the switching time of the shutter glasses from on to off (or vice versa) were as long as a significant fraction of the entire viewing period.

Typical operating characteristics for such 3D video shutter glasses are 120 Hz emission rate of the video screen, meaning 60 Hz per shutter glass element, which is equivalent to an entire period lasting 16.66 ms, whereas typically opening and closing times may add up to several milliseconds per full period.

While it is easy to see that short dark periods between image frames emitted by the video screen make the gating with slowly reacting shutter glasses more robust, the combination with accurate synchronization means that throughout significant parts of the full viewing period not a single shutter glass is open. As a side effect, ambient light is visibly reduced.

Another point addressed by the invention is the need to save energy. In a number of applications (e.g. when it comes to laptops or other types of portable computers), the energy consumption of the screen is rather high, which leads to a reduced timespan over which one can use the computer without having to recharge the battery. This applies in particular in sunlit environments where one has to turn up the brightness of the screen in order to have an acceptable contrast of the image. Turning up the brightness however leads to a higher energy consumption, which, in turn, reduces the battery life.

In order to increase battery life of other computing devices, such as traditional pocket calculators, a solar panel has been incorporated. In the case of such calculators, which typically have a simple LCD display with no backlight, the energy consumption is rather low, so that a typically quite small solar cell can power such a calculator. However, for devices with a higher power consumption, such as laptop computers, powering it using such a solar panel incorporated into the computer is simply not feasible in the prior art.

In particular, in prior art devices, if the solar cell should only compensate for the power consumption of the laptop screen, which, in bright environments is dominated by its light source (typically LED or OLED), it needs to be considerably larger in area than the laptop's screen. In particular, to achieve the same brightness, the size ratio between the solar cell and screen must be no smaller than the efficiency of all components involved to convert the incoming sunlight into light that may be used for the laptop screen. This sets a lower limit for the solar cell size in relation to the size of the laptops screen:
Size Ratio>efficiency=$Q\_solarcell*Q\_led*Q\_lcd\_matrix$=0.2 *0.5*0.5=1/20, where the numbers are conservative estimates. In the above equation, size ratio defines the ratio area laptop screen/area solar cell. $Q\_solarcell$ is the efficiency of energy conversion of the solar cell, $Q\_led$ is the efficiency of the LEDs which produce the light used for the screen, and $Q\_lcd\_matrix$ refers to the efficiency of the LCD matrix used in the screen. I.e., put differently, the solar cell needs to be about 20 times the size of the screen if this should achieve the same brightness as the sun-lit surrounding.

Using a laptop screen with an approximate size of 20 cm*30 cm, this means the solar cell attached to it would need to be approximately 1.2 m$^2$ in area, which, in addition to being heavy, does not fit on most tables. If the viewer is happy with a screen intensity equal to ⅕ of the sunlight intensity, this area would be still 0.24 m$^2$, or 4 times the area of the screen. In other words, to significantly extend battery life, huge solar cells need to be carried around. Smaller solar cells may extend battery life, but solar cells with dimension of a laptop, which cannot fully compensate for the screen illumination, are likely to convey a reduced benefit, and may be counterproductive, when the system is intentionally transferred into intense sunlight to harvest more electric energy.

SUMMARY OF THE INVENTION

The inventor realized two problems. Firstly, there is the clear need to provide more energy efficient portable computers or, more generally, system for displaying information. In particular, for example when working in remote environments with no readily available electricity network, having a computer which works just using sunlight is clearly an advantage. This also applies when sitting on a beach or, say, in a garden or a public park where one typically does not have readily available power sockets.

Another problem the inventor saw himself faced with was to increase the contrast, in particular when working outdoors, as pointed out above. As set out above, when sitting in sunlight, reading a computer screen on a normal laptop is difficult, and turning up the intensity consumes a lot of energy, which is not easily available when using a computer which is powered by a battery. Further, it is clear that for the needed high intensities of the screen, a power supply by means of a solar panel would be insufficient.

The invention solves the above two problems.

The invention is defined in claim 1. The dependent claims define preferred embodiments.

The inventor noticed that if one uses pulsed light sources as part of the screen (emission devices) together with synchronized googles (selective viewing devices) for looking at the screens, the energy consumption of the screen becomes so low that powering the screen by a solar panel of roughly the size of a screen becomes feasible.

According to claim 1, a system for displaying information comprises an emission device which is arranged to emit light so as to display information to a user. Such an emission device could, for example, be a computer or a laptop screen.

The emission device is adapted to emit the light in a pulsed manner so that the intensity of the light varies between a high value and a low value. Those intensity variations result in brightness variations in the perceived light. By the light being emitted in a pulsed manner, it is meant that in a typically repeating manner, light is emitted at a higher intensity value for some time periods and is, between those time periods, emitted at a lower intensity. The repeat rate of the high intensity pulses is chosen high enough so as to avoid visible flickering (typically, the repeat rate is higher than 50 Hz).

The system for displaying information further comprises a selective viewing device which comprises a panel. Such a selective viewing device could, for example, be spectacles to be worn by a user, where the glasses of those spectacles would then form the panel. The panel is adapted so that the user can view the light which is emitted by the emission device through that panel so as to visually perceive the information being displayed. The panel has a variable transparency which can be varied between a state of high transparency and a state of low transparency. By high transparency and low transparency, we mean that visible light is either largely blocked, in the state of low transparency, and its transmission through the panel greatly increases in the state of high transparency. Compared with low transparency, the high transparency state refers to a state where the light transmission is at least 30 times higher, preferably at least 100 times higher and most preferably at least 300 times higher.

In practical embodiments of the invention, in which the panel comprises LCD shutter glasses, deviations of the time-dependent transmission function from a perfect top hat function might occur so that the boundaries are less sharply defined.

The system is adapted to synchronize the emission device and the selective viewing device so that the states of the emission device emitting light at a high intensity value and the states of the panel of the selective viewing device of high transparency overlap in time. By overlapping, it is meant that they at least occur for some parts of their high-transparency values/high-intensity values simultaneously (i.e. at the same time). By doing so, it is ensured that whenever the emission device emits light at a high intensity value, the selective viewing device is also at a high transparency, thus enabling a viewer to view the emitted light. This allows for selectively viewing the light which is emitted by the emission device whilst blanking out or at least suppressing the light which may be present in the surroundings during the remainder of the time.

Typically, the intensity of those peaks will fluctuate slightly—i.e., one will not have a perfect top hat function which describes the high intensity emissions. Accordingly, the duty cycle refers to the ratio between those time periods during which the intensity of the emitted light is no less than 90% of the peak intensity which is emitted by that device during a particular repeat period, divided by the full repeat period of those high-intensity peaks. The time periods when the intensity of the light is at a low intensity value are defined by the intensity being less than 50% of the high intensity peak value during that period.

While the preferred implementation uses binary on and off states of the screen, that temporarily match the binary open and closed states of the shutter glasses, respectively, variants of this scheme might also lead to some reduction of contrast. It is essential that a significant fraction of all light emitted during a given period of time, is emitted and gated during one or more short sub-periods of the full period. As a characteristic, the time-dependent emission signal of the screen will have a strongly increased standard deviation compared to shutter glasses operated for 3D vision applications.

Compared with prior art solutions, which imply a basic scheme according to which ambient light is selectively suppressed by spectacles, such that light emitted from a video screen is perceived at higher contrast, the claimed solution provides a higher contrast and lower energy consumption. Proposed embodiments of these strategies include optical elements and filters tailored to selectively transmit the frequency characteristics of certain light emitting video screens. Specifically, prior art solutions first suggest the rejection of ambient light based on the selective gating of light of certain narrow frequency ranges (wavelength ranges) that are emitted by such video screens. Furthermore, they suggest that the use of video shutter glasses that operate at the same frequency and synchronized with a time-modulated video screen, may improve its contrast, even though the shutter glasses operate at frequencies (typically 50-240 Hz) that are many orders of magnitude lower than oscillation frequencies of the emitted light waves.

Problematically and logically in line with description of selective light gating by electromagnetic frequency (wavelength), prior art devices refer to this phenomenon of ambient light reduction as a method of matching the frequency characteristics between an emitting screen and shutter glasses. In doing so, they pay special attention not only to a matching of the precise repetition frequency, but also possible temporal off-set. According to prior art solutions, a possible offset, that may reduce the effect of ambient light reduction, may be minimized by schemes according to which the shutter glasses are being synchronized with the emission time of the screen. As the purpose is not primarily 3D vision in the context of some prior art devices, the prior art devices proposed use a scheme in which the shutter glasses open simultaneously. Opening times per glass, however, remain comparable to the single opening times of 3D shutter glasses, and hence the effect of only modest ambient light attenuation is not significantly altered or enhanced.

While possibly beneficial in some environments, or in combination with gating by wavelength, prior art devices do not allow for an appropriately strong selective attenuation of intense ambient sun light based on shutter glass gating alone.

This means, the prior art devices only enable to reduce ambient light to the same extend described in US 2012/0194657 A1 which described this phenomenon as a problem that may occur under lower light conditions. In particular the prior art devices do not systematically address the problem that intense sunlight (with luminosities most likely exceeding 100.000 lux) can be multiple hundred times brighter than a typical laptop screen, which typically emits with a perceived brightness of less than 500 lx.

The problem of optimizing the contrast enhancement to a degree that video screens have a satisfactory contrast in intense sun-lit environments can also not be achieved by reversing the scheme that the prior art (US 2012/0194657 A1) used to increase the ambient light perceived by the eye. According to such reasoning, one could attempt to use opening times of the shutter that are shorter than the emission times of the screen. This, however, will result in the same contrast as perceived with shutter glasses that are precisely synchronized with emission times, and no further contrast enhancement will be gained.

The inventor has found that the claimed system produces a much better contrast than prior art systems. In particular, the inventor became aware of the importance of having a short duty cycle, which was not previously realized, stipulated and or mentioned by prior art. Further, it is advantageous if during those periods when light is emitted, it is emitted at a higher intensity than for "normal" devices. Accordingly, during those periods, the emitted light is "brighter" in comparison and more easily visible to an observer. Further, since light is only emitted some of the time, energy consumption is reduced. With the new and claimed solution, what is reported as a disadvantage in US 2012/0194657 A1 is both qualitatively and quantitatively refined and extended such that the disadvantage is turned into an advantage.

The invention relies in parts on a scheme of altering parameters that were not mentioned and or stipulated by prior art solutions.

In line with contrast optimization by matching electromagnetic oscillation frequencies, prior art solutions centrally specified frequency and off-set minimization by a synchronization scheme as important parameters.

One important parameter has no analogue in the domain of wavelength matching, and was therefore possibly not identified to be of high relevance for efficient contrast optimizing by the use of shutter glasses. This is the duty cycle, which specifies the ratio of ON times for one period.

Reducing this duty cycle, from its typically value of around 40%, to values lower than 10%, preferably lower than 2% is the first step toward realizing the invention reported here. This modification alone is able to reduce energy costs of the display illuminating light source by a factor of approximately 4 to 100 fold, in some scenarios it may reduce this energy consumption 250 fold compared to the prior art.

Of note, this reduction of the duty cycle is by no means trivial. If we consider a widely accepted repetition rate of 120 Hz or higher, which minimizes flicker experienced by the user, a full period is 8.33 ms. A duty cycle of 10% would require the shutter glasses to be open for only 0.83 ms. Given that standard liquid crystal cells require around 1 ms for a full open-closure cycle, it would be a challenge to fully open such a shutter for a time as little as 0.83 ms without significant performance reduction due to insufficient bi-direction switching speeds. Very clearly for a duty cycle of 2%, that requires an opening time of 0.166 ms standard liquid crystal cells are not sufficient. To solve this problem the inventor made use of two successive liquid crystal cells, one of which enables the entering an open, transmitting state (opening time 0.03 ms to 90% transmission), while the second one enables an equally fast closing (0.03 ms to reduce transmission down to 10%). Due to the increase complexity of these shutter-glasses, both on the liquid crystal side, as well as for the driving electronics, these shutter glasses are usually not used in the field of the invention. However, it is to be noted that other selective viewing devices with sufficiently short bi-directional response times can also be used.

A second parameter whose optimization is favorable to enable the use of video screens in intense sunlight is to increase the intensity of the screen during the duration of an emitting pulse/flash.

Also this might require non-trivial modifications for the screen. As bright sunlight can easily exceed recommended office brightness by a factor of 100, also light sources for screens visible outdoors preferably have 10, more preferably 30-100 times higher brightness. The custom light source 107 used by the inventors can be seen in FIG. 9.

Figure 9:
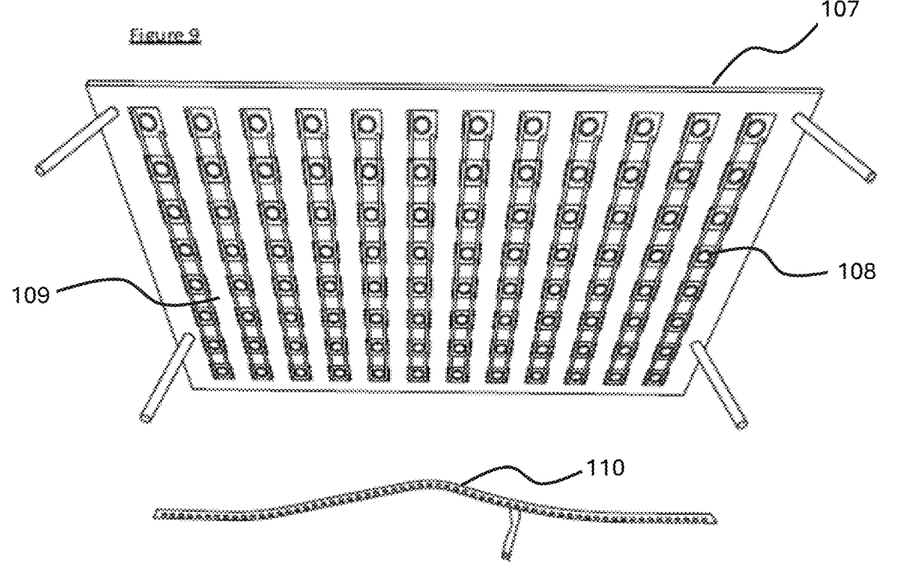
FIG. 9 shows prior art light sources (bottom) and light sources used in the present invention (top).

In FIG. 9, the top shows the light source 107 used in the prototype where a total of 96 high power LED light sources 108 was arranged in a rectangular array 109. Shown underneath is the light source 110 which was built into the computer by default. It is estimated that the new light source 107 is approximately 100 times as powerful as the original light source 110 of the computer.

When taken together, the right choice of a duty cycle (a parameter which was not relied on in prior art devices) and the use of high intensity pulses (also not relied on in prior art devices) allows for watching video screens in an intensely sun-lit environment, without introducing the cost of higher energy consumption.

Prior art devices did not focus on these two parameters (duty cycle, pulse intensities). Hence, prior art schemes only reproduce a shutter gated ambient light reduction to the same small degree, that was reported as by US 2012/0194657 A1 before. In particular, prior art devices do not allow for viewing high contrast video screens in intensely sun-lit environments.

A further advantage achieved by the present invention is that the light emitting devices of the system may be down-sized. Specifically heat sinks as part of a LED-based light emitting device might be reducible in size due to the fact that the time average intensity and energy consumption may be reduced. Generally, when producing light at high intensities, heat generation can be a major concern. This can cause problems to the light source itself, the electronics as well as the optical elements of the system. Further, when wearing a head mounted device, excessive generation of heat can cause discomfort and even injuries to a user. Since less energy is consumed by the invention described herein, the generation of heat may also be reduced. In certain embodiments of the invention this may allow the downsizing of the system, in particular with respect to the physical dimension of the battery, heat management hardware, and the light source.

According to the invention, the system further comprises a photoelectric conversion means. This means could, for example, be a solar cell which converts ambient light into electric energy. This energy is then fed into the system. It could be fed directly to the emission device, but it could also be used to drive the CPU, a memory device, etc. It is also an option to store the energy in the system, as will be explored further below. Given the drastically reduced energy consumption of the screen thanks to only having to drive it for a fraction of the time, using such a solar cell to power the system becomes possible without having to use an excessively large solar cell.

The present inventor recognized that the technology described previously has, in addition to the improved contrast, a potential for a significant reduction in energy. He further recognized that this reduction in energy consumption opens the door for a laptop computer which can be properly driven by solar cells, which was hitherto unpractical.

The realization here is that a strategy of using longer solar charging periods than outdoor operating periods, can be generalized by using shorter operation times of the emission device than the times when the photoelectric conversion means is exposed to ambient light.

In particular it is possible to use the present technology to show the user only short images by strobing the light source in the screen with a small duty cycle and selectively gating these images via shutter glasses to the eyes of the user as we previously described. During this time high screen intensities can be reached, which, as an example may have an intensity 20 times higher than the usual intensity of a laptop screen would be operated at, resulting in an e.g. 10.0001× peak brightness, that now accounts for the perceived brightness of the screen, with even higher values being feasible.

Importantly, thanks to the lower energy consumption, being exposed to sunlight is no longer a disadvantage for using the system for displaying information. Rather, it leads to a higher production of energy, which can be high enough to have a positive net storage of energy in an energy storage device.

The system thus preferably further comprises an energy storage device. Such a device could be an arrangement of one or more rechargeable batteries. It could also comprise one or more capacitors. This energy storage device is arranged to supply energy to the emission device. Such an energy storage device can serve as a buffer between high intensity peak emissions and may also be used to compensate fluctuations in the ambient light intensity.

It is preferred that the energy storage device comprises at least a first and a second energy storage component. Those energy storage components could be rechargeable batteries. They could, however, also be capacitors. The system could be arranged so that one of the first and the second energy storage components charges whilst the respective other one supplies energy to the emission device. The system is arranged to swap the first and the second energy storage components so that the respective energy storage component which previously was charged is now used to supply a energy to the emission device whilst the respective other energy storage component is charged. This way of operating the energy storage device is considered advantageous, since the charging operation has an approximately constant or at least slowly varying voltage, which is advantageous for efficient charging a battery. In contrast, thanks to the pulsed way of operating the emission device, the energy storage component which supplies the emission device with energy may experience a somewhat unstable voltage. If one were to attempt to charge it whilst, at the same time, supplying energy to the emission device, the charging performance would be detrimentally affected. It is beneficial if such fluctuations are not present charging the energy storage components. The current which is used for charging the battery can also be used to drive the CPU. This is advantageous since the thus produced current might have reduced noise, compared with current from the other battery which is used to drive the emission device.

It is preferred that the photoelectric conversion means comprises a solar cell having an area exposed to ambient light which falls the range of from 50 $cm^2$ to 5000 $cm^2$, preferably 200 to 2000 $cm^2$ and even more preferably 400 to 1200 $cm^2$. Such areas lead to a solar cell and a photoelectric conversion means which can be easily carried and which is significantly reduced in size compared with prior art solutions.

In a preferred variant of the present invention, the duty cycle of the emission device is preferably less than or equal to $1/20$, more preferably less than or equal to $1/100$, and even more preferably less than or equal to $1/250$. Such duty cycles improve the viewing experience even more.

It is preferred that the emission device is arranged to have an ambient contrast ratio of larger than 1, preferably larger than for and more preferably larger than 10 is reached. The ambient contrast ratio is defined as in H.-W. Chen et al., "Liquid crystal display and organic light-emitting diode display: present status and future perspectives", Light: Science & Applications (2018) 7, 17168. Such an emission device leads to a high visibility of light and of the screen.

It is preferred that the emission device is arranged so that the intensity at the low value is less than 20%, preferably less than 10% of the intensity of the high level intensity, wherein even more preferably, no light is emitted when the emission device is set to emit light at the low value of the intensity. This ensures a significant difference between the high level and the low level of the intensity.

The system is arranged so that the power consumption of the emission device is less than the power production by the photoelectric conversion means. It is preferably less than 90%, more preferably less than 70% and even more preferably less than 50% of the power production by the photoelectric conversion means. This allows for charging a battery whilst operating the system.

It is preferred that the system is part of a portable computer system, which is a particularly advantageous way of using the invention.

In that context, it is preferred if the portable computer comprises a screen having a front side and the rear side. The front comprises the emission device as to display area of the screen. The rear side of the screen comprises the photoelectric conversion means. Such an arrangement is particularly space efficient. The photoelectric conversion means preferably covers more than 70% and more preferably between 90% to 100% of the area of the rear side of the screen. Having such a space usage is particularly efficient.

It is also preferred that the photoelectric conversion means is provided so as to fold out or slide out from the portable computer. This is a particularly efficient way of storing the photoelectric conversion means.

Alternatively, the photoelectric conversion means is a component which is separate from the remaining components of the portable computer system and which can be separated from those components without the use of a tool. For example, could be simply plugged in using a plug and could be connected to the portable computer system by means of a cable. This allows for a high degree of flexibility.

It is also possible to implement the system using a laser projector and/or a video projector as the emission device. Also in such systems, the advantages mentioned previously are present.

According to another preferred arrangement, the emission device and the photoelectric conversion means are incorporated into a tablet computer. The emission device could be the screen of the tablet computer, and the photoelectric conversion means could be arranged behind the screen so as to convert light which is incident from the front into electric energy, or it could be arranged on the rear side of the tablet computer so as to convert light incident on the back side of the tablet computer into electric energy.

DETAILED DESCRIPTION OF THE DRAWINGS

Figure 1:
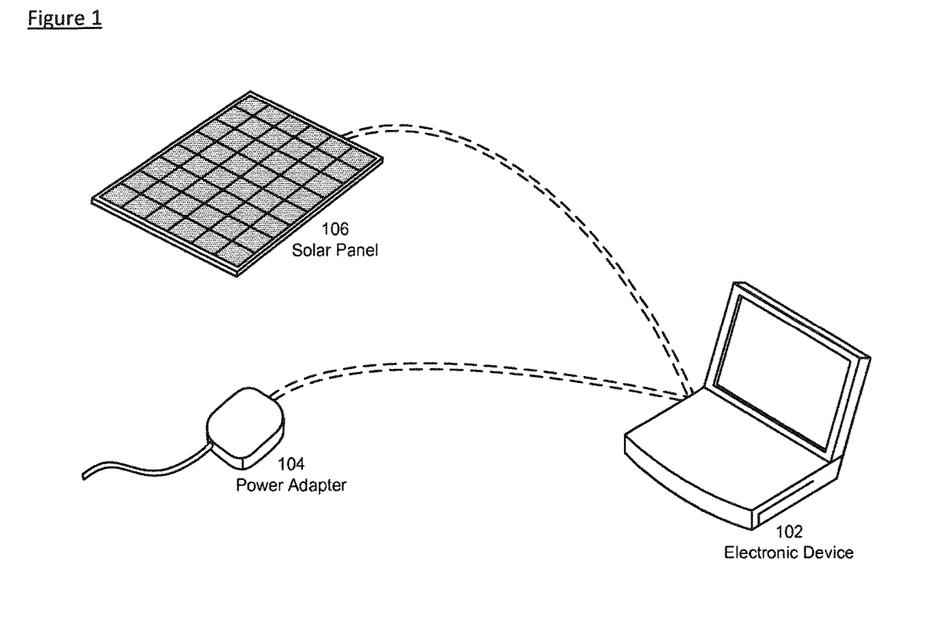
FIG. 1 shows a prior art design taken from US 2013/0290743 A1.

FIG. 1 is a drawing showing a prior art device. A solar panel 106 is connected to an electronic device (laptop) 102 and provides it with energy. Further, a power adapter 104 is connected to provide supplemental energy. However, given the power consumption by the laptop screen, it is to be expected that the solar panel 106 would need to be extremely large to power the electronic device 102.

Figure 2:
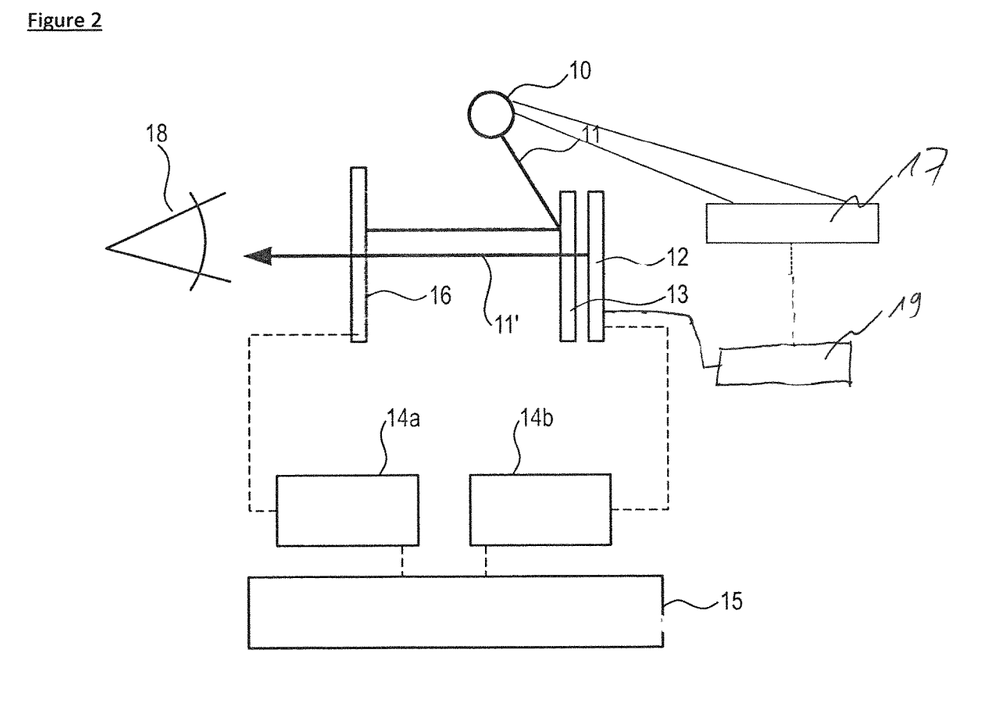
FIG. 2 is a schematic drawing of a system according to the invention.

FIG. 2 shows, schematically, a first embodiment of the present invention. A light source 12 is provided so as to illuminate an LCD matrix 13. Such a light source 12 could be the LED backlight of a computer screen. Connected to light source 12 is a driver 14b which is, in turn, connected to a function generator 15. This function generator 15 is connected to a second driver 14a which is, in turn, connected to shutter glasses 16. An observer 18 views the image which is produced by light source 12 emitting light 11' which passed through LCD matrix 13. Of note, an ambient light source 10 (e.g. the sun) is also present and emits light 11.

Figure 3:
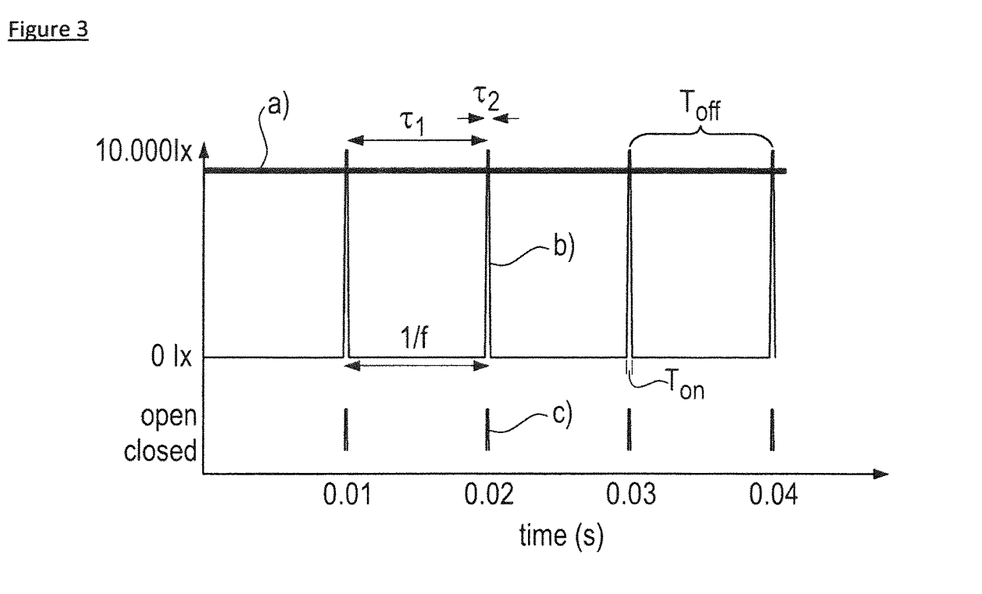
FIG. 3 shows the timing synchronization of the selective viewing device and of the emission device.

The shutter glasses 16 are arranged to periodically vary between a high-transparency state and low-transparency state, as is shown in FIG. 3. Here, FIG. 3b) shows the intensity of the light source 12 varies in time. Synchronized with this intensity variation are the shutter glasses 16, as is shown in FIG. 3c), where the label "open" refers to the shutter glasses having a high transparency and where the label "closed" refers to the shutter glasses having a low transparency. In contrast to that, the light emitted by ambient light source 10 is constantly at the same level (cf. FIG. 3a)). By selectively opening the shutter glasses 16 for the light 11' emitted by light source 12 only during those time periods when the shutter glasses 16 have a high transparency, this light 11' is selectively perceived by observer 18. Since human eyes only generally perceive the average light intensity, light emitted by light source 12 is thus primarily observed, also since the light emitted by the light source is, during those time periods when light is emitted at a high intensity, at least as bright or even brighter than ambient light. Consequently, the perceived image contrast is increased and sufficient to enable satisfactory vision of a screen even in environments of high ambient intensity. We also note that the use of a common function generator 15 for first driver 14b and second driver 14a makes synchronizing the shutter glasses 16 and the light source 12 easier to implement. We also note that in FIG. 3c), the time periods are indicated as $T_{on}$ and $T_{off}$ which show the time periods when the shutter glasses have a high transparency ($T_{on}$) and when they have a low transparency ($T_{off}$). In this context, the duty cycle can be defined as $T\ T_{on}/(T_{on}+T_{off})$. $T_{on}$ is 100 µs, and $T_{off}$ is 0.00990 s, leading to a theoretical contrast enhancement of 100.

Connected to the light source 12 is a photoelectric conversion element (solar cell) 17. Light from the ambient light source 10 impinges on the photoelectric conversion element 17 and produces energy. The energy is supplied to an energy storage device 19 where energy can be stored. This energy is then used to drive the emission device 12 as well as being supplied to other components of the system.

Figure 4:
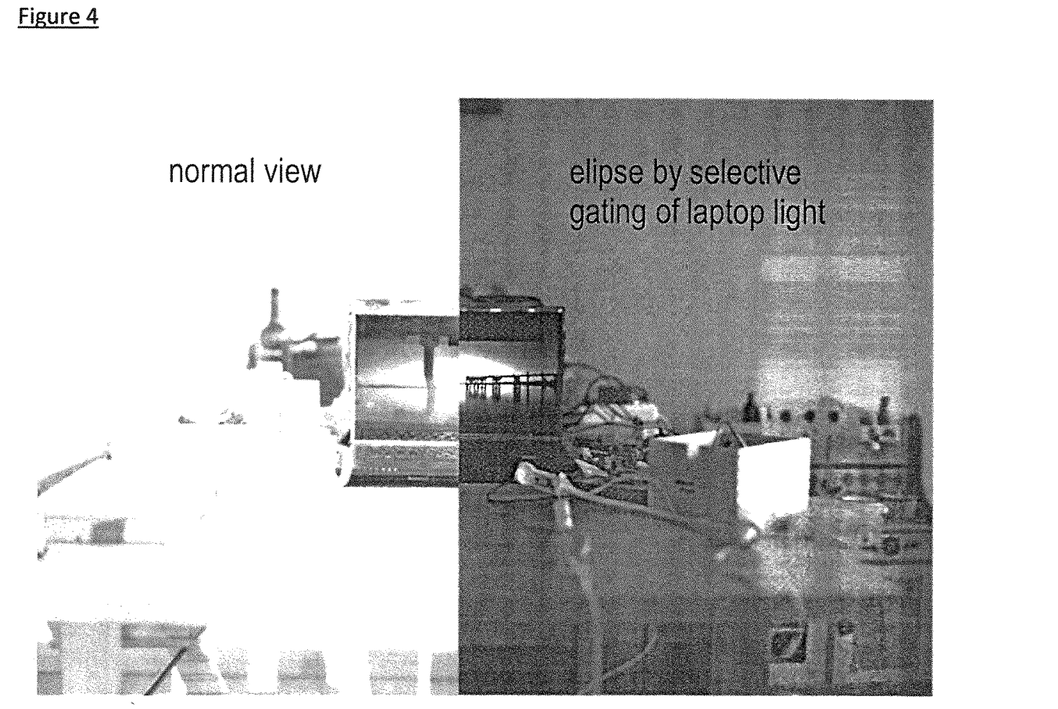
FIG. 4 shows a comparative view of a prior art laptop and of a laptop according to the present invention.

FIG. 4 shows the results obtained using a prototype system. In the left view, one sees a normal view (i.e. without the inventive technology) of the laptop of the inventor in a home environment. Whilst the screen of the laptop can be seen, it is also noticeable that the contrast is not particularly high. Further, it is easily noticeable that the ambient light is much brighter. In the right-hand side of that image, the same environment is shown using the claimed invention. It is noticeable that the ambient light is dimmed to a significant degree and that also, the contrast on the computer screen is much higher. I.e., by selectively "eclipsing" the ambient light and selectively "gating" the laptop light, one achieves a higher contrast of the image to be seen on a laptop screen. In such cases, the screen could serve as a "slave" to the spectacles.

Figure 5:
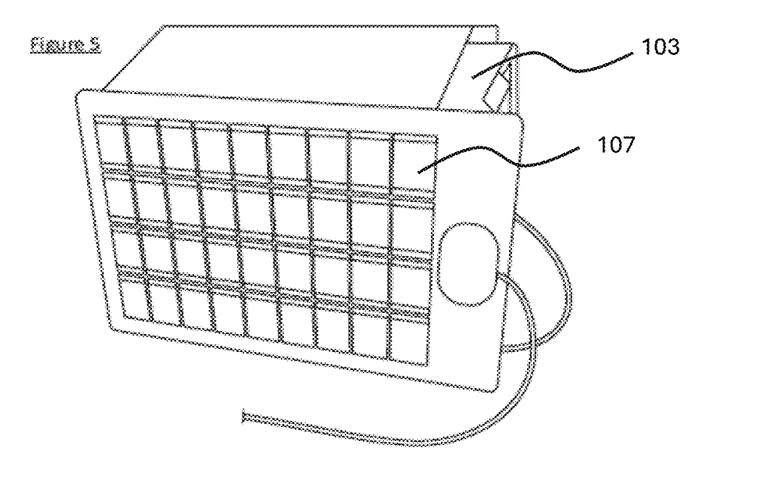
FIGS. 5 and 6 show view of the laptop according to the present invention.

FIG. 5 shows a photograph of a laptop 103 according to the present invention. As can be seen, the rear side of the laptop 103 has been covered with a photovoltaic panel 107 which has approximately the same size as that rear side.

Figure 6:
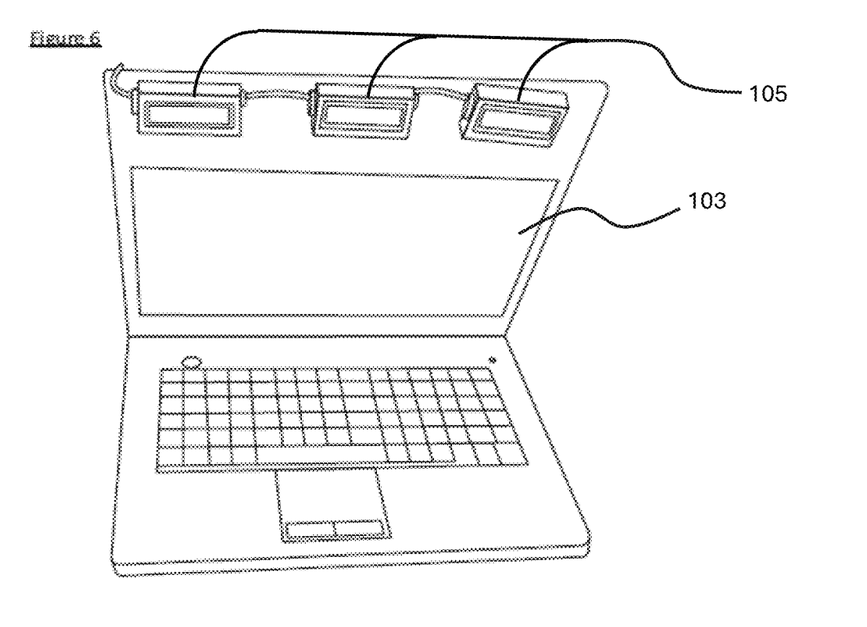

This can also be seen from FIG. 6 where the front of the laptop is shown. Again, it can be confirmed that the area covered by the solar panel is approximately the same as the area of the screen of the laptop.

FIGS. 7a) and b) show schematically the power consumption of the laptop as a function of the brightness of sunlight when used in environments that are exposed to sunlight. Those drawings have been obtained based on the assumption that one will tune the brightness of the laptop screen so as to have an adequate contrast.

We shall consider FIG. 7a) first. The horizontal, dashed line denotes the intensity independent power consumption by components of the laptop. This could, for example, be the power consumption of the hard drive, CPU, Wi-Fi adapter, etc.

This power consumption is constant for an increasing brightness of the sunlight, since this power is consumed regardless of how much ambient light there is.

The inclined line with the reference numeral I denotes the solar power production. It is clear that this production increases approximately linearly with the brightness of the sunlight and that for no sunlight, no power is produced.

The line III shows the power consumption of the light source of this screen as a function of the intensity of the sunlight. It is understood that the brighter the sunlight, the brighter the screen has to be so as to provide an acceptable contrast. Also this power consumption is roughly proportional to the brightness of the sunlight. Finally, line II shows the net power consumption of the laptop as a whole, where the energy produced by the solar cell is taken into account, so that the remaining net energy requirement is shown. As can be seen from this schematic drawing, the power produced by the solar panel is significantly less than the power consumed and described by line III, such that the resulting net power consumption II remains positive and increases with increasing brightness.

FIG. 7b) shows the power consumption of a laptop according to the present invention. Here, the same notation was used as is also used in FIG. 7a), with an additional "'" to denote the differences. Again, the energy production by the solar cells increases approximately linearly with the brightness of the sunlight, as identified by the line I' (which should be identical to the line I in FIG. 7a)). However, the energy consumption by the screen is significantly reduced since its light source only needs to be operated a fraction of the time (cf. line III'). With the power consumption by the other components being approximately constant, as indicated by the dashed line, the net power consumption (line II') is reduced and shows a negative slope. In particular, it becomes negative starting from a point A. Accordingly, with a laptop according to the present invention, energy can even be produced whilst operating it outdoors.

Figure 8:
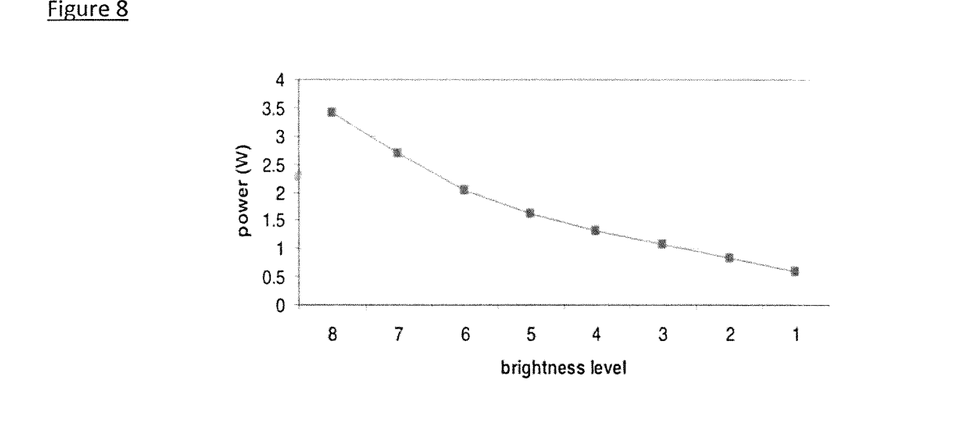
FIG. 8 shows the power consumption of laptop screens as a function of the brightness level.

FIG. 8 shows schematically the power consumption of the screen increases with the brightness level.

The operation of the prototype shown in FIGS. 5 and 6 is now described. The prototype is a standard laptop PC where the screen has been modified and fitted with optoelectronic components to only emit light from the screen at a certain repeat rate. Goggles which have a transparency which is synchronized with the screen were worn by a user. A repeat rate of 250 Hz was used for the screen to avoid noticeable flickering.

It is then the case that electric power is consumed by the light sources only during the durations of light emissions for which we used a repetition rate of e.g. 250 Hz, together with a duty cycle of $1/40$, meaning an on-time of 0.1 ms. With an adequate light source that is e.g. 20× brighter than usual, peak power consumption will also be 20× than before. However, because the duty cycle is $1/40$, the time-average energy consumption of the screen will be reduced by half. In other words, the screen contrast is perceived as 20× higher than before, at a reduced energy consumption compared to the case of operating a laptop conventionally. Alternatively, with peak intensities that are 5 times increased compared to normal usage, the battery consumption of the screen would even be reduced 8 fold.

It was tested whether such a laptop can be used in sunlight. The contrast was found to be satisfactory, as can also be seen from FIG. 4, which shows photos obtained using a prototype which does not have a solar panel fitted. Further, the user can now benefit from intense ambient sun light. In particular, the light intensities in the surrounding are available throughout the entire duty cycle and may be used to charge the battery laptop, such that a laptop sized solar panel with dimension of e.g. 20 cm×30 cm can even be sufficient to (over-)compensate for the entire power consumption of the screen's light source.

This was also confirmed from the prototype which was built. When using that prototype, the inventor found a solar panel of approximately these dimensions (compare FIG. 7) to be sufficient to produce more electric power than consumed by the light source of the laptop. In particular, he connected this solar panel to the batteries driving the laptop's screen light via a maximum-power-point-tracking (MPPT) electric-power-converter to charge batteries while operating the screen. This way, he found 3.4±0.5 Watts of electric power sufficient to operate light sources and comfortably view the screen in the very same environment in which a solar panel positioned on the back of the laptop produced 4.8-5.2 Watts of solar power (all measured with in-line power meters 105 as seen in FIG. 6). This proof of concept shows that, despite a sub-optimal design, and despite using a rather old and somewhat inefficient computer, solar cells on the backside of the screen can be used to compensate for the energy consumption of the screens light source, and even provide some extra energy beyond. It was thus shown that the solar panel produces enough energy to drive the screen whilst also having approx. 1 W of energy surplus. This would be enough to drive modern, energy efficient electronics like a computer and thus shows that the prototype could be extended to be a stand-alone laptop.

This shows that suddenly, battery life of laptop complemented by small solar cells may increase when operating the device in bright, compared to dimmer environments. This means that taking a laptop from a position in the shadow to a position exposed by direct sunlight may extend battery lifetime without compromising on image contrast.

The inventor further considered whether this would allow one to watch a movie on a bright beach on a laptop whilst entirely relying on solar energy to drive the laptop.

To start with, the following numbers should be suitable to put the elevated energy consumption of a laptop screen in a bright environment into proportion to the rest of its components. A usual laptop (i.e. Macbook air 2018) is reported to have a battery capacity of 50.3 Wh, with which, depending on usage, it runs up to 12 hours according to Apple. This means that the average power consumption during this time is around 4.2 Watts. At normal (office) usage 1-2 Watts of this of this will be used by the screen, and the highest fraction of this for its illumination.

Furthermore, the Lenovo Thinkpad model 410s had a 4 Watt LED source built-in. Likewise, 3.5 Watts of electric power consumption were reported for older generation laptops. This means that normal laptops use a significant fraction, if not most of their power consumption, to operate the light source within the screen, particularly when attempting to generate good contrast via intensity adjustment in bright environments. In particular, when transitioning from an indoor office, which in Germany typically has a recommended luminosity of 500 lx, outdoors might necessitate to increase screen brightness 10-fold or more, in order to achieve a given desired contrast. This however would result in energy costs that cannot be compensated for by a solar panel. As a reference, a panel with the size of 32×22 cm² will produce up to 10 Watts of electric power (referenced for a maximum sun light intensity of 1000 Watts/m²). When testing it attached to a laptop screen according to the state of the art, the obtained 5 Watts of electric energy were far away from producing an appealing ambient contrast ratio under normal viewing conditions.

Complemented by the technology of only emitting pulsed light, the power requirement of the screen's light source drops significantly. As an example, that technology may be used to obtain a perceived brightness (contrast) increase of 10 fold, while decreasing the energy consumption of the screen even 4 fold compared to standard (indoors) use.

Figure 7:
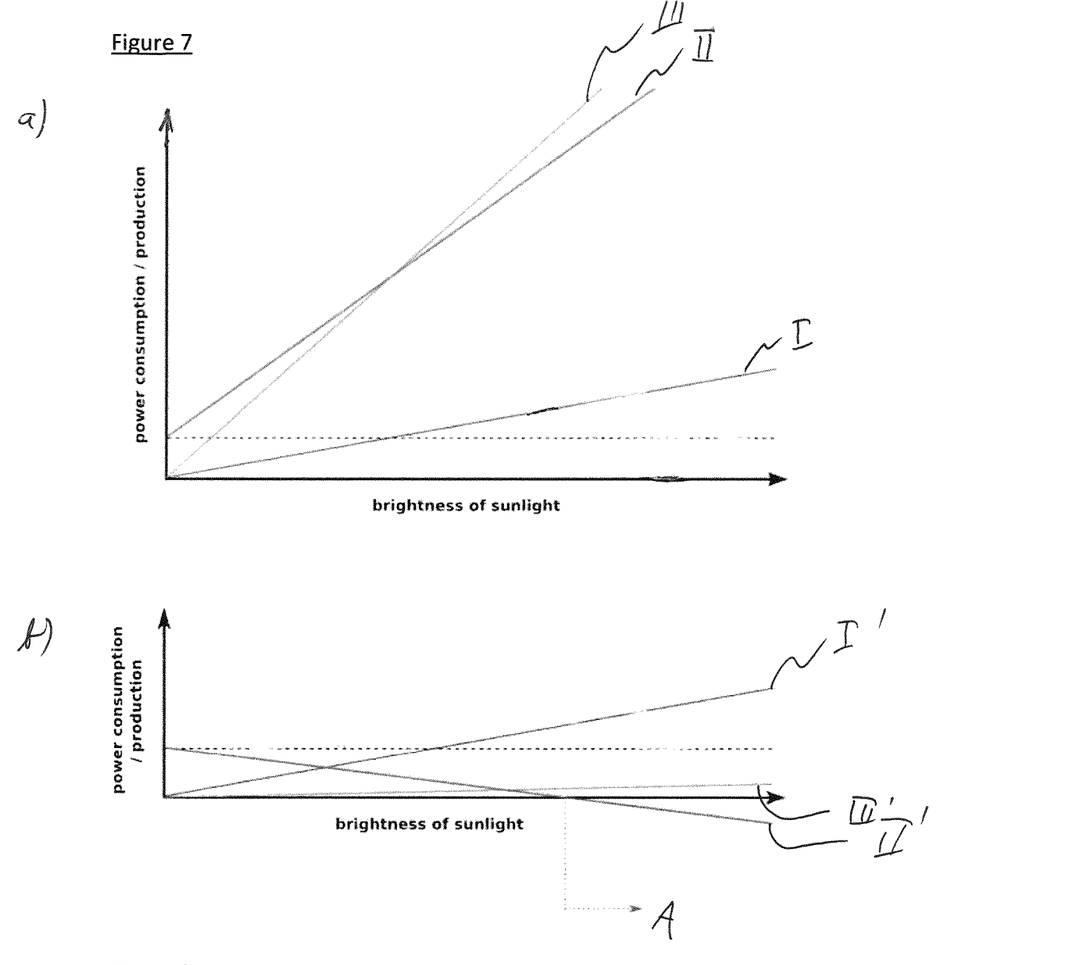
FIG. 7 shows diagrams showing the power consumption of prior art devices and devices according to the present invention.

This power balance is valid for a particular example but its implications can be generally understood when considering the net power balance of the laptop operating outdoor. The diagrams in FIG. 7 compare the outdoor uses of a conventional solar laptop outdoor with the solar eclipse laptop. As one can see, with a duty cycle that reduces screen energy consumption by $1/40\times$, meaning down to 2.5%, the net power balance favorably increases with increasing sun light intensity, even for a fixed ambient contrast ratio. This means that with a solar cell comparable to the dimension of the laptop, batteries may be charged while using the laptop.

Would this allow to charge a laptop while watching movies at the beach? This depends on how much energy the laptop needs to operate other components. We have already explained above that it was managed to obtain a decent ambient contrast ratio with the prototype. Given that this prototype is operating far from optimally (as an example an important foil was removed that back-reflects non-LCD-transmitted light and thereby reduces energy consumptions of typically >25%), there is much room for improvements, and clearly energy consumption could be reduced a significant fraction, such that very reliably more than 1 Watt of electric power remains available to power other components. As can be learnt from the iPhone 7 website, which allows to watch up to 13 hours of video with a 11.1 Wh battery, 1 Watt of electric power is more than enough to operate hardware to send a high resolution video signal to a screen. In conclusion the here presented system enables to charge laptops via screen-sized solar panels while operating them.

The invention claimed is:

1. A system for displaying information, comprising:
   an emission device arranged to emit light so as to display information to a user, the emission device being adapted to emit the light in a pulsed manner so that the intensity of the light varies between a high value and a low value; and
   a selective viewing device comprising a panel, the panel being adapted so that the user can view the light which is emitted by the emission device through the panel so as to visually perceive the information being displayed, the panel having a variable transparency which can be varied between a state of high transparency and a state of low transparency,
   wherein the system is adapted to synchronize the emission device and the selective viewing device so that the states of the emission device emitting light at a high-intensity value and the states of the panel of the selective viewing device of high transparency overlap in time,
   the system further comprising:
   a photoelectric conversion means arranged to convert ambient light into electric energy which is fed into the system; and
   an energy storage device arranged to supply energy to drive the emission device, such that the energy produced by the photoelectric conversion means is used to store energy in the energy storage device, and
   wherein the energy storage device comprises at least a first energy storage component and a second energy storage component, and the system is arranged so that one of the first energy storage component and the second energy storage components is charged by the photoelectric conversion means while the respective other of the first energy storage component and the second energy storage component supplies the energy to drive the emission device.

2. The system according to claim 1, wherein the system is arranged to swap the first energy storage component and the second energy storage component, so that the one of first energy storage component and the second energy storage component which previously was charged is now supplying the energy to drive the emission device while the respective other of the first energy storage component and the second energy storage component is charged by the photoelectric conversion means.

3. The system according to claim 1, wherein the photoelectric conversion means comprises a solar cell having an area exposed to ambient light which falls within a range of from 50 $cm^2$ to 5000 $cm^2$.

4. The system according to claim 1, wherein the emission device has a duty cycle of less than or equal to $1/20$, and wherein the panel of the selective viewing device is configured to operate at essentially the same duty cycle as the emission device.

5. The system according to claim 1, wherein the emission device is arranged so that an ambient contrast ratio of larger than 1 is reached.

6. The system according to claim 1, wherein the emission device is arranged so that the intensity of the light at the low value is less than 20% of the intensity of the light at the high-intensity value.

7. The system according to claim 1, wherein the system is arranged so that the power consumption of the emission device is less than the power production by the photoelectric conversion means.

8. A portable computer system comprising the system according to claim 1.

9. The portable computer system according to claim 8, wherein the portable computer comprises a screen having a front side and a rear side, the front side comprising the emission device as the display area, and the rear side of the screen comprising the photoelectric conversion means, and wherein the photoelectric conversion means covers more than 70% of the area of the rear side of the screen.

10. The portable computer system according to claim 8, wherein the photoelectric conversion means is provided so as to fold out from the portable computer.

11. The portable computer system according to claim 8, wherein the photoelectric conversion means is a component which is separate from the remaining components of the portable computer system, and wherein it can be separated from those components without the use of a tool.

12. The system according to claim 1, wherein the emission device comprises at least one of a laser projector and a video projector.

13. The system according to claim 1, wherein the emission device and the photoelectric conversion means are incorporated into a tablet computer.

14. The system according to claim 3, wherein the area exposed to the ambient light ranges from 200 $cm^2$ to 2000 $cm^2$.

15. The system according to claim 4, wherein the duty cycle is less than or equal to $1/100$.

16. The system according to claim 5, wherein the ambient contrast ratio is larger than 4.

17. The system according to claim 6, wherein the intensity of the light at the low value is less than 10% of the intensity of the light at the high-intensity value.

18. The system according to claim 7, wherein the power consumption of the emission device is less than the power production by the photoelectric conversion means by less than 90%.

19. The portable computer system according to claim 9, wherein the photoelectric conversion means covers more than 90% of the area of the rear side of the screen.

* * * * *